(No Model.)
P. C. ILLGEN.
TESTING DEVICE FOR COUNTING MECHANISMS.
No. 407,932. Patented July 30, 1889.
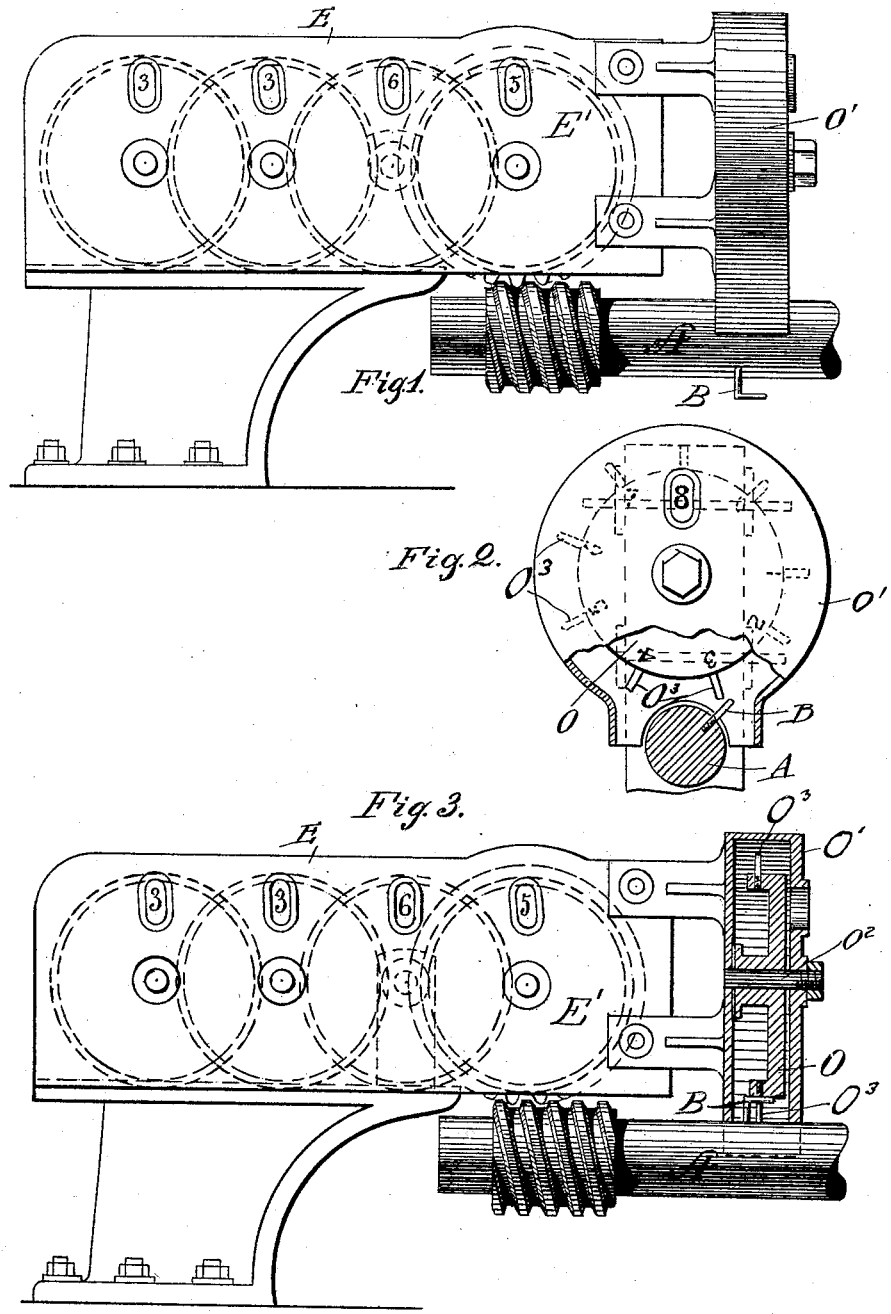

UNITED STATES PATENT OFFICE.

PAUL CLEMENS ILLGEN, OF LEIPSIC, SAXONY, GERMANY, ASSIGNOR OF ONE-HALF TO PAUL EDUARD KÜRSTEN, OF SAME PLACE.

TESTING DEVICE FOR COUNTING MECHANISMS.

SPECIFICATION forming part of Letters Patent No. 407,932, dated July 30, 1889.

Application filed January 29, 1889. Serial No. 297,912. (No model.)

*To all whom it may concern:*

Be it known that I, PAUL CLEMENS ILLGEN, manufacturer, of Leipsic, in the Kingdom of Saxony and German Empire, have invented a new and useful Testing Device for Counting Mechanisms, of which the following is a specification, reference being had to the accompanying drawings.

This invention consists of an improved device for proving the result registered by the counting mechanism employed in speed-indicators, gas and water meters, calculating-machines, and the like, the object being to provide means whereby the accuracy of the figures displayed may at any time be tested.

In the accompanying drawings, Figure 1 is a side elevation, Fig. 2 a sectional end elevation, and Fig. 3 a sectional side elevation, of a testing device constructed in accordance with my invention.

The rotary movement of the shaft A is communicated to the first or units disk E' of the counter mechanism E in the usual or any convenient manner, a series of other disks for indicating the tens, hundreds, thousands, and so on being geared with the units-disk in the ordinary way. Upon the shaft A a finger or projection B, or equivalent contrivance, is mounted so as to engage with and operate a supplementary disk O, mounted to rotate on a shaft $O^2$ in a casing O', open at its lower end for the entrance of the finger B. Said disk O has its periphery divided into any suitable number of divisions, and is also provided thereat with a series of pins $O^3$. In the present instance nine divisions and nine pins are shown. The number of the divisions and the number of the pins must be the same. These divisions are marked, respectively, 0 to 8, one numeral only being visible at a time—that is, one division on the supplementary disk is marked with a cipher, the other divisions being numbered from such cipher consecutively. The supplementary disk may, if preferred, be actuated from the units-disk instead of from the shaft. In either case, at each complete revolution of the shaft or other rotating part with which the counting mechanism is connected the supplementary disk is rotated to the extent of one of its divisions.

Whenever it is desired to test the accuracy of the figures or sum denoted by the counting mechanism, such sum is divided by a test divisor corresponding with the number of the divisions marked on the supplementary disk. (In the present illustration the test divisor would be 9.) The remainder, if any, should, if the sum indicated be accurate, correspond with the number exposed on the supplementary disk, and if there be no remainder the cipher should be in view. If the figures do not so agree, the counting mechanism is proved to be out of order and incapable of making a proper record.

This testing device may be applied to any form of counting mechanism.

What I claim, and desire to secure by Letters Patent of the United States, is—

1. A device for testing the accuracy of counting mechanism, comprising a moving part, as a rotating shaft, numbered counting-disks operated by said moving part to count the movements of said moving part, a numbered and divided supplementary disk moved at each movement of said moving part a distance corresponding to one of its divisions, whereby the accuracy of the number shown on the counting-disks may be determined by observing whether, after dividing the said number by the number denoting the sum of the divisions of the supplementary disk, the remainder, if any, is the same as the number exposed on the said supplementary disk, substantially as described.

2. The combination, with the driving-shaft of a counting mechanism and a finger carried by said shaft, of a supplementary counting-disk mounted to rotate at a right angle to said counting mechanism, and having a series of pins at its periphery adapted to be engaged by the finger on said shaft, substantially as shown and described.

3. The combination, with a series of counting-disks mounted and geared for rotation one with another, the units-disk having teeth at its periphery, and a driving-shaft having a worm thereon meshing with the teeth of said units-disk, of a supplementary counting-disk mounted to rotate at a right angle to the principal counting-disks and having a series of pins at its periphery, a casing open at its bottom and apertured at its front inclosing said supplementary disk, and a radial finger carried by the driving-shaft of the counting mechanism, adapted to engage the pins on the supplementary counting-disk, substantially as shown and described.

In witness whereof I have hereunto set my hand in presence of two witnesses.

PAUL CLEMENS ILLGEN.

Witnesses:
CARL BORNGRAEBER,
ERNST SCHOLZ.